March 17, 1959
W. B. FOSTER
2,877,615
POULTRY PACKAGING MACHINE
Filed June 22, 1956
3 Sheets-Sheet 1
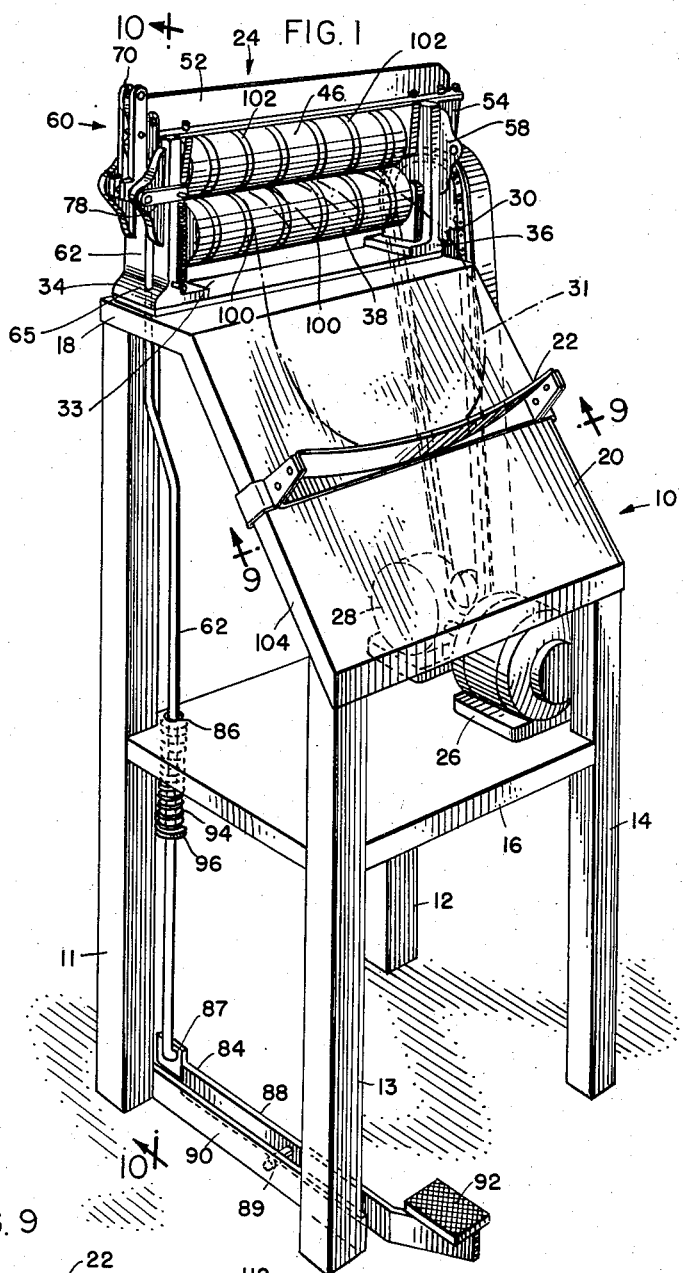
FIG. 1
FIG. 9
INVENTOR:
WILLIAM B. FOSTER
BY
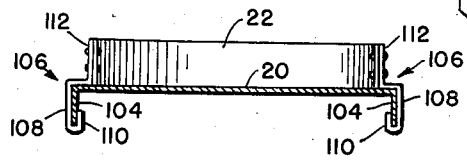
ATT'YS March 17, 1959 W. B. FOSTER 2,877,615
POULTRY PACKAGING MACHINE
Filed June 22, 1956 3 Sheets-Sheet 2
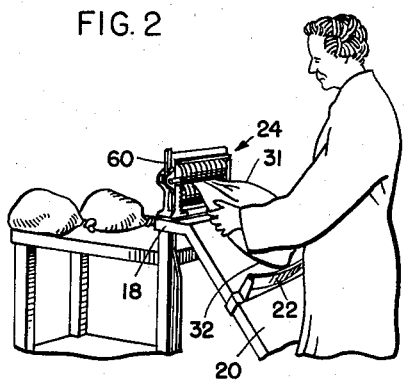
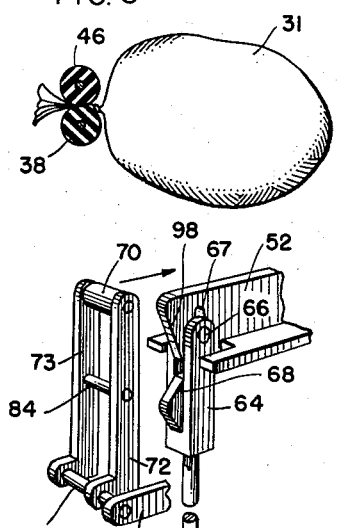
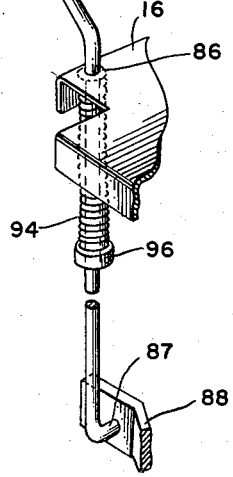
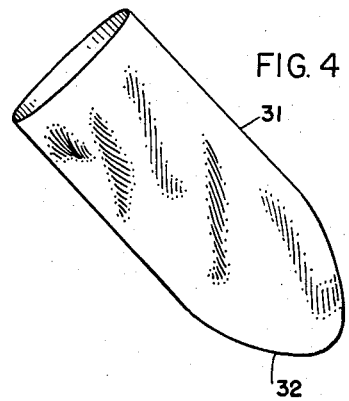
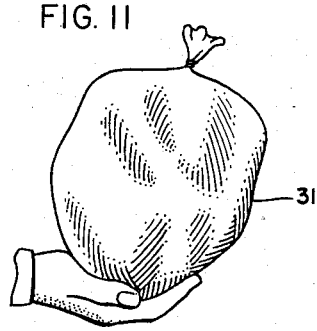
INVENTOR:
WILLIAM B. FOSTER
BY
ATT'YS March 17, 1959  W. B. FOSTER  2,877,615
POULTRY PACKAGING MACHINE
Filed June 22, 1956

INVENTOR:
WILLIAM B. FOSTER
BY
ATT'YS

2,877,615
POULTRY PACKAGING MACHINE
William B. Foster, Minneapolis, Minn.

Application June 22, 1956, Serial No. 593,120

5 Claims. (Cl. 53—371)

This invention relates to packaging machines and more particularly to a machine for packing and sealing dressed poultry and other suitable finished meat products within a transparent bag for shipping, display, and retail sale purposes. This invention may be utilized also in carrying out the invention set forth in my co-pending application Serial No. 567,206 filed February 23, 1956.

Prior to the present invention, food products such as turkeys, chickens, hams and the like were packaged in transparent plastic bags and the air within the package and surrounding the product was exhausted by means of a vacuum apparatus. Also, after the air was exhausted, the packaged articles were then placed in a hot water bath to shrink the plastic film of the bag to remove any looseness and to cause it to closely surround the article. A disadvantage of this method is that the necessary vacuum equipment is costly and requires frequent adjustment and maintenance attention. In addition, the required motions of an operator and the necessary extra equipment for this method of handling are relatively many and consequently labor and machinery costs are comparatively great.

Another disadvantage is that the successful use of ordinary plastic bag packaging often requires that the operators press the products against their chests in order to manipulate the product to afford access for the vacuum line to air pockets within the package, as adjacent a bird's wings and legs, and in many poultry packing plants employing female operators it has been found that this practice is a probable cause of cancer of the breast. As a result of this practice, compensation claims have proved costly to many poultry packers.

Another disadvantage of ordinary methods when used to pack poultry is that when the plastic bag film is subjected to rapid freezing, it becomes extremely brittle. As a result, ruptures of the film often occur in the normal course of handling in freezer rooms and shipping, thus permitting undesirable dehydration of the product with consequent loss of food value and flavor. Also, upon rupture of the bag the product is attacked by atmospheric oxygen and thereby becomes so discolored that it is no longer saleable, and further, upon such exposure to air the product absorbs odors from other foods and from the atmosphere. In such cases the product must be repackaged, if the broken bag is discovered in time, which greatly increases the over-all cost of the product. Furthermore, in the case of any packaging procedure requiring vacuum equipment and a shrinkage of the bag film, the bag merely conforms to the shape of the article and has a tendency to impart an unattractive shape to the package product.

With this in mind, a primary object of the present invention is to provide apparatus for packaging food articles such as poultry, or the like, wherein a product may be efficiently and effectively enveloped with an exhausted, hermetically sealed, flexible enclosure of transparent plastic or the like material without need for evacuation equipment or shrinkage processing.

A further object of the invention is to provide an improved apparatus of the stated type wherein dressed poultry may be packed so that it automatically assumes a desirable rotund or "butterball" configuration most suitable for handling, shipping and display purposes.

Another object of the invention is to provide an improved apparatus for packaging dressed poultry and other food products which may be safely utilized by a relatively unskilled operator and without need of bringing the article being packed into contact with the operator's body.

A still further object of this invention is to provide packaging apparatus for poultry by means of which the dressed bird may be packed in a bag of plastic film with a minimum of air pockets in the configuration of the packaged article and consequently with a minimum of film under unsupported tension.

Further objects of the invention are to provide a device of the herein described type in which substantially all of the exterior surface of the article being packed is brought into contact with the enveloping film automatically as the wrapper is applied and sealed; and to provide a device of the stated type by means of which the wrapper is so applied that the possibility of breakage is substantially eliminated and the need for repackaging products with damaged wrappers, with its consequent extra handling costs, is substantially reduced.

Other and further objects, advantages and features of the present invention will be apparent to those skilled in the art from the following description, taken in conjunction with the accompanying drawings showing a specific embodiment of this invention, and in which:

Figure 1 is a view in perspective of a packaging machine made in accordance with the invention for packaging meat products in tight fitting plastic bags.

Fig. 2 is a similar perspective view showing the improved packaging machine in use and illustrating the manner of its operation.

Fig. 3 is a view illustrating the manner in which the bag is sealed at the completion of the packaging operation.

Fig. 4 is a view of a bag of the type with which the improved packaging machine is intended to work.

Fig. 9 is an elevational view partly in section taken substantially on line 9—9 of Fig. 1.

Fig. 10 is a view showing the foot pedal actuated release and operating means for the roller assembly; and Fig. 11 is a view showing a dressed bird packaged by the machine of Fig. 1.

Figure 5:
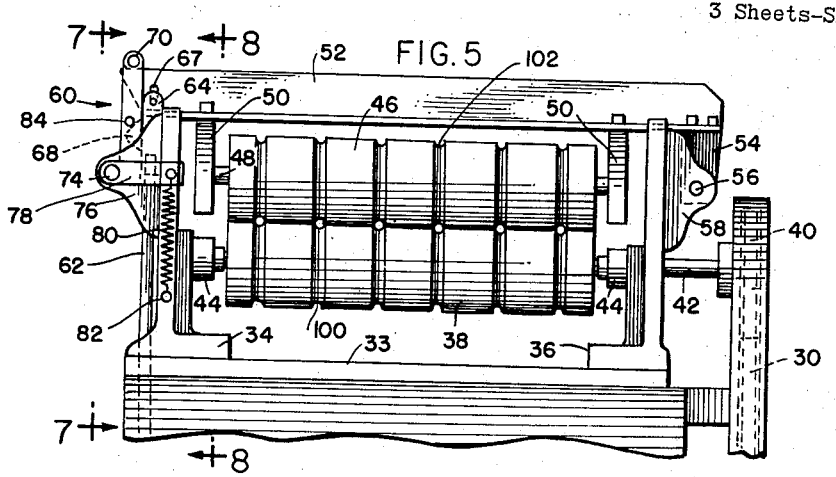
Fig. 5 is an elevational view of the roller assembly of the packaging machine of Fig. 1, showing the rollers in their operative position when in use.

Referring now to the drawings, and more particularly to Figure 1, the packaging apparatus of the present invention is shown in a preferred embodiment which comprises a base 10 having elongated rear legs 11 and 12 and shorter front legs 13 and 14, held in fixed relation with respect to each other by means of suitable bracing such as a shelf 16. A platform 18 extends between the rear legs 11 and 12 and is joined by an inclined work surface or table 20, extending forwardly and downwardly at an angle of approximately 45° from the horizontal with its front end supported on the front legs 14.

Slidably mounted on the work surface 20, by a means hereafter described, is a saddle 22 on which an article to be packaged may rest at the beginning of the packaging operation. Mounted on the platform 18 is a roller assembly 24 which is driven by a motor 26 mounted on the shaft 16. As shown, power is transmitted to the roller assembly 24 by means of a reduction gear 28 and a belt or chain 30 connected to drive the lowermost roller of the roller assembly as shown in Fig. 5. Also as shown, the plane of the inclined work surface or table 20 is such as to substantially intersect the nip or bight between the rollers of the roller assembly when the rollers are in operative and mutually engaged relation.

According to the present invention and as shown in Fig. 2, an article such as a dressed fowl which has been loosely inserted into a suitable plastic bag 31 of polyethylene or the like, is placed upon the work surface 20 and is initially supported by the saddle 22. The loose open end of the bag is then inserted into the nip of the roller assembly 24, and as the rollers turn the bag is drawn over the fowl while the latter is supported by the operator's hands and guided into engagement with the rollers. As the fowl reaches the rollers the bag is continued to be pulled by the rollers and is drawn tightly over the fowl forcing it into rounded closed end 32 of the bag so that the free end of the fowl is compressed and rounded into a compact "butterball" form as shown in Fig. 11. Means hereinafter described are provided in the roller assembly to afford discharge of air entrapped in the bag as the bag is drawn over the body of the fowl and into tight engagement therewith.

Referring now more particularly to Figs. 5 to 8 inclusive, the roller assembly 24 includes a base or bedplate 33 at opposite ends of which are mounted upstanding standards 34 and 36. Suitably journalled in the standards 34 and 36 is a roller 38 which is driven by the motor 26 through the reduction gear 28, the belt or chain 30 and a pulley or sprocket 40 which is mounted on the roller shaft 42. Axial movement of the roller 38 is precluded by means of collars 44 disposed at each end of the roller adjacent the inner surfaces of the standards 34 and 36. A driven roller 46 is mounted on a shaft 48 journalled in suitable brackets 50 depending from the arms of an inverted T-bar 52 which is pivotally mounted by means of a depending end bracket 54 on a pin 56 which in turn is journalled in ears 58 rigidly secured to the outer surface of the upper portion of the standard 36. As shown, the roller 46 is releasably retained in engagement with the roller 38 by means of a dog assembly 60 which is arranged to engage the T-bar 52 and hold it in clamped position.

Figure 6:
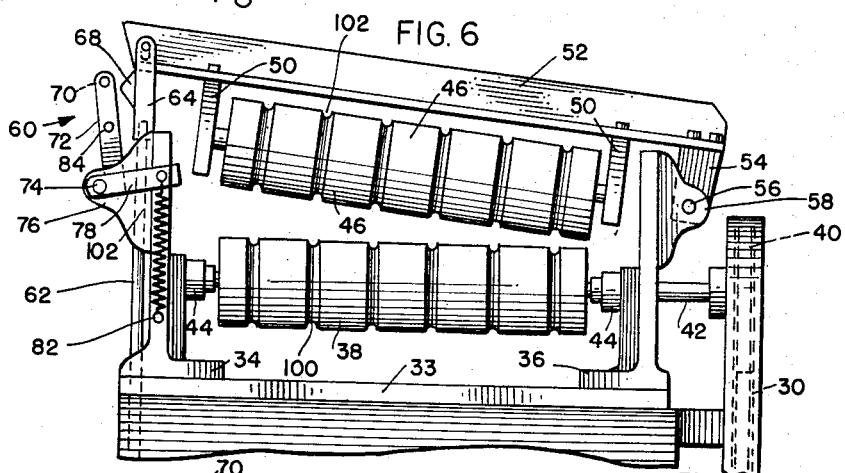
Fig. 6 is an elevational view similar to Fig. 5 but showing the roller assembly in the position for release of the bag upon completion of the packaging operation.
Figure 7:
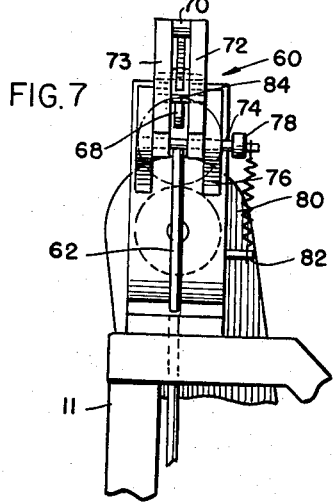
Fig. 7 is an elevational view taken substantially on line 7—7 of Fig. 5 to show the roller clamping and release means.
Figure 8:
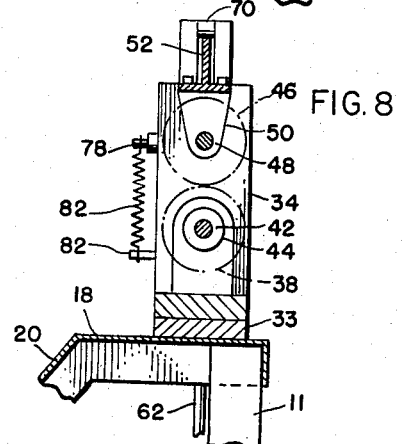
Fig. 8 is a vertical sectional view of the same taken substantially on line 8—8 of Fig. 5.

The dog assembly 60 retains the driven roll 46 in the position shown in Fig. 5 during the packaging operation and permits release of the roller 46 when the operation is completed. The released position of the roller 46 is shown in Fig. 6 and release is effected by means of a foot pedal actuated operating rod 62 which extends upwardly along the outer face of the standard 34 and has its upper end attached to a cam member 64 which is pivotedly connected with the outer end of the T-bar 52. As shown the operating rod 62 extends downwardly through an opening 65 in the outer base of the standard 34, through the bedplate 33 and the platform 18, and thence along the inner side of the leg 11 to a foot operated lever which will be later described.

As best seen in Fig. 10, the cam member 64 is bifurcated at its upper end to receive the leg of the T-bar 52 and is connected thereto by means of a suitable pin 66 which extends through a vertical slot 67 in the T-bar, the purpose of the slot 67 being to permit a certain vertical movement of the cam member before lifting of the T-bar occurs upon upward movement of the rod 62. Also the cam member 64 is provided with a cam tooth or element 68 which, upon movement of the cam member, operates to release the dog assembly 60 from its locking engagement with the T-bar 52.

The dog assembly 60, as shown, includes a roller 70 which, in the present instance, is rotatably mounted on and between the upper ends of parallel laterally spaced bars 72 and 73 which are fixedly secured to a shaft 74 journalled in laterally spaced ears 76 and 77 secured to the upper portion of the outer surface of the standard 34. The shaft 74 extends outwardly beyond the ear 76 and to this outer end is fixedly secured a lever arm 78 to the other end of which is attached one end of a tension spring 80 secured to a suitable pin 82 projecting from the standard 34. A cam pin 84 is also mounted on the bars 72 and 73 to extend between them immediately above the normal position of the cam tooth 68 on the cam member 64. To minimize friction the pin 84 may also be a roller. The spring 80, acting through the lever arm 78, normally holds the dog assembly in its inward position, shown in Fig. 5, wherein the roller 70 is latched over the leg of the inverted T-bar 52 which is received between the bars 72 and 73. However, when the operating rod 62 is raised, the cam tooth 68 on the cam member engages the cross pin 84 and thereby causes the dog assembly to swing outwardly to disengage the roller 70 from the T-bar 52. At that point the pin 66 of the cam member reaches the upper end of the slot 67 and further upward movement of the rod 62 lifts the T-bar and causes opening or separation of the rollers 46 and 38, as shown in Fig. 6.

The rod 62 extends through an opening 86 in the shelf 16 and its lower end is pivotally connected at 87 to a lever 88 which is pivoted about a pin 89 mounted on a bar 90 secured to the left rear and front legs 11 and 13, as viewed from the front of the apparatus. At the opposite end of the lever 88 is a foot pedal 92 which may be depressed by the operator for upward movement of the release rod 62 to afford counterclockwise movement of the dog assembly 60, through the action of the cam member 64, with consequent disengagement of the roller 70 from the T-bar 52 and a lifting of the T-bar and the roller 46. The dog assembly 60 is normally urged into the latching position of Figs. 1 and 2 by means of the tension spring 82, however, to assure return of the roller 46 into engagement with the roller 38, a compression spring 94 is mounted on the rod 62 to bear between the underside of the shelf 16 and a collar 96 fixed on the rod 62. This spring 94 is strong enough to force the rod 62 downwardly as soon as the operator removes his foot from the pedal 92, and cause the roller 46 to return to its clamped engagement with the roller 38.

Upon downward movement of the release rod 62, the cam tooth 68 again engages the cross pin 84 and forces the dog assembly outwardly to clear the end of the T-bar 52, and the T-bar leg is also provided with an outwardly and upwardly sloping end edge 98 to assure its passing the roller 70, so that when the roller 46 comes into engagement with the roller 38 the dog assembly will snap into position with its roller 70 on top of the T-bar leg to clamp the rollers 46 and 38 firmly together.

According to the present invention means are provided for exhausting air from a bag entrapped by the manual insertion of a dressed bird. To this end, openings are provided at the nip of the rollers so that the marginal edges defining the open end of a bag are grasped at spaced points and, as the bag is drawn over the bird by the rollers, entrapped air is forced past the product for escape between the rollers. These openings may assume a variety of forms and may if desired be the annular spaces between separate longitudinally spaced roller segments. In the preferred form, the rollers 38 and 46 are unitary and the openings are provided by longitudinally spaced circumferential grooves 100 and 102 which are arranged so that the grooves of one roller are in register with the grooves of the other roller. By this arrangement a plurality of longitudinally spaced circular openings are formed through which discharge of entrapped air from the bag is effected as the article is forced into the closed end of the bag and the bag is pulled tightly around the body of the article.

The work surface 20 is preferably of a non-corrosive material such as stainless steel or the like and is preferably arranged so that it is tangential to the upper side of the roller 38. At each side of the work surface 20 are depending flanges 104 (see Fig. 9). Brackets 106 are provided with outwardly and then downwardly turned right angular legs 108 for cornerwise engagement with the margins and flanges 104 of the work surface and the bottom ends of the legs are turned upon themselves as at 110 to embrace the lower edges of the flanges 104, thus securing the brackets onto the sides of the work surface 20 and at the same time providing sliding engagement with the flanges 104, which serve as tracks, for adjustment of the brackets lengthwise of the work surface 20. The saddle 22 is secured to upstanding arms 112 of the brackets 106 and adjustment of the brackets and saddle along the work surface is for accommodating fowl or other articles of varying sizes. Set screws (not shown) may be utilized to retain the brackets 106, and consequently the saddle 22, in a predetermined desired position.

In operation, as when packaging dressed poultry, the bird is placed preferably hocks end first in a tubular bag of suitable, somewhat elastic, plastic material such as polyethylene or the like which is approximately the diameter of the bird to be packaged and is desirably formed with a parabolic or elliptical closed end. The saddle 22 is moved to a position suitable for the size of a particular run of fowl. The bagged bird is then placed in position in abutment with the saddle and the edges of the bag defining the open end are directed into the nip of the rollers. As the rollers grasp the bag and pull it through, the bird is drawn toward the rollers as the bag is pulled over it and at the same time the bag material is manipulated by the operator so that air pockets are eliminated and so that the bag is brought into snug engagement with the skin of the bird particularly at the forward or breast end. As the article engages the rollers and the bag is continued to be drawn, the product is compressed into the closed end of the bag so that it assumes a rotund substantially uninterrupted conformation in which the hocks of the bird are pressed tightly against the body and the tail end is forced inwardly and rounded. Meanwhile substantially all air entrapped behind and around the bird is exhausted from the bag through the openings at the nip of the rollers and the sides of the bag are converged inwardly around the breast end by the operator's hands. At this time the operator spins the article about its long axis so that the neck of the bag becomes twisted, as shown in Fig. 3, and a clamp is applied to effect a complete seal. This final twisting of the bag neck stretches the bag material and rounds the neck end of the bird. The packaged bird is removed from the rollers by operation of the foot pedal 92 and the excess bag material at the neck is trimmed away leaving the finished article, as shown in Fig. 11.

In the present invention the need for vacuum and dipping equipment is eliminated along with the costly hand procedures involved with such equipment. Also by the use of the present apparatus, film of the polyethylene type may be efficiently and effectively applied to dressed poultry. This type of film exhibits important advantages over thermoplastic films currently in use. For example, it is very much stronger at below freezing temperatures, resists puncture and breakage because of its elastic nature, and because of its inherent stretch it may be mechanically pulled into skin tight contact with substantially the entire surface of the article packed. The present apparatus is also capable of applying plastic film to a product in such a tensioned manner that a puncture of the bag will usually seal itself along the periphery of the puncture because the wall of the bag will not rip and continues to resist the internal pressure of the product thereby allowing the product to close off the puncture opening to preclude the entry of air.

It will be apparent that this invention may be embodied in devices which differ in many respects and details from the particular embodiment disclosed. Also, it will be understood that many products other than fowl, particularly in the frozen foods field, may be packaged by the apparatus herein disclosed. Therefore, although but one specific embodiment of this invention has been herein shown and described it will be understood that numerous details of the construction shown may be altered or omitted without departing from the spirit of the invention as defined by the following claims.

I claim:

1. Apparatus for packaging food articles such as poultry and the like loosely received in a flexible bag-like enclosure having an open end, comprising a roller assembly having a pair of parallel cylindrical mutually contacting rotating rollers for grasping the open end of said enclosure and for drawing said enclosure tightly about said article and into the nip of the rollers of said assembly while the article is maintained relatively stationary on the entry side of said rollers, said rollers being in contact with each other for a major portion of their lengths and one of said rollers having a circumferential groove to provide an opening between the rollers, whereby air entrapped within the enclosure is discharged from said open end and through said opening as the enclosure is drawn into tight fitting envelopment of the said article, means normally holding said rollers in running engagement with each other, means for driving one of said rollers, and means operable to shift the other roller out of contact with the first named roller to release said enclosure.

2. Apparatus for packaging articles of food such as poultry or the like having irregular body formations or appendages in stretchable bag-like plastic enclosures to provide a compact rotund form to the packaged article, comprising a frame, a roller assembly mounted on said frame, a downwardly extending work surface mounted on said frame on one side of said roller assembly parallel with the roller axes, adjustable means for supporting a fowl on said work surface in a predetermined position with respect to said roller assembly, said roller assembly including a driving roller and a parallel pivotally mounted driven roller normally in rolling engagement therewith, said driven roller being swingable in a plane common to the axes of said rollers, releasable means for retaining said driven roller in rolling engagement with said driving roller, said rollers being provided with longitudinally spaced annular peripheral channels, the channels of one roller being in register with the channels of the other roller to form openings between the rollers, whereby the open end of an enclosure containing a fowl may be grasped and drawn progressively through the nip of the rollers and into snug enveloping engagement with the fowl while entrapped air within the enclosure is exhausted through said openings as the enclosure is pulled over the fowl and the fowl is compacted endwise into the enclosure.

3. Apparatus for packaging articles of food in stretchable bag-like plastic enclosures comprising a frame, a roller assembly mounted on said frame, a downwardly extending work surface mounted on said frame, on one side of said roller assembly parallel with the roller axes, adjustable means for supporting an article on said work surface in a predetermined position with respect to said roller assembly, said roller assembly including a driving roller and a parallel pivotally mounted driven roller normally in rolling engagement therewith, said driven roller being swingable in a plane common to the axes of said rollers, releasable means for retaining said driven roller in rolling engagement with said driving roller, said rollers being provided with longitudinally spaced annular peripheral channels, the channels of one roller being in register with the channels of the other roller to form openings between the rollers, whereby the open end of an enclosure containing an article may be grasped and drawn progressively through the nip of the rollers and into snug enveloping engagement with the article while entrapped air within the enclosure is exhausted through said openings as the enclosure is pulled over the article and the article is compacted endwise into the enclosure, and foot-operated means for disengaging said releasable means and swinging said driven roller away from said driving roller.

4. Apparatus for packaging articles of food in stretchable bag-like plastic enclosures comprising a frame, a roller assembly mounted on said frame, a downwardly extending work surface mounted on said frame, on one side of said roller assembly parallel with the roller axes, adjustable means for supporting an article on said work surface in a predetermined position with respect to said roller assembly, said roller assembly including a driving roller and a parallel pivotally mounted driven roller normally in rolling engagement therewith, said driven roller being swingable in a plane common to the axes of said rollers, releasable means for retaining said driven roller in rolling engagement with said driving roller, said rollers being provided with longitudinally spaced annular peripheral channels, the channels of one roller being in register with the channels of the other roller to form openings between the rollers, whereby the open end of an enclosure containing an article may be grasped and drawn progressively through the nip of the rollers and into snug enveloping engagement with the article while entrapped air within the enclosure is exhausted through said openings as the enclosure is pulled over the article and the article is compacted endwise into the enclosure, foot-operated means for disengaging said releasable means and swinging said driven roller away from said driving roller, and means for reengaging said rollers and said releasable means upon release of the foot-operated means.

5. Apparatus for packaging articles of food having irregular body formations or appendages in stretchable bag-like plastic enclosures to provide a compact rotund form to the packaged article, comprising a frame, a roller assembly mounted on said frame, a work surface mounted on said frame on one side of said roller assembly parallel with the roller axis, said roller assembly including a driving roller and a parallelly mounted driven roller normally in rolling engagement therewith, said driven roller being movable in a plane common to the axes of said roller, releasable means for retaining said driven roller in rolling engagement with said driving roller, said rollers being provided with circumferential channels, a channel of one roller being in register with a channel of the other roller to form a constant opening between the rollers, whereby the open end of an enclosure containing an article may be grasped and drawn progressively through the nip of the rollers and into snug enveloping engagement with the article while entrapped air within the enclosure is exhausted through said opening between the rollers as the enclosure is pulled over the article and the article is compacted endwise into the enclosure.

References Cited in the file of this patent
UNITED STATES PATENTS

| | | |
|---|---|---|
| 198,473 | Stowe | Dec. 25, 1877 |
| 767,268 | Felsing | Aug. 9, 1904 |
| 1,652,424 | Cameto | Dec. 13, 1927 |
| 2,054,970 | Etten | Sept. 22, 1936 |
| 2,545,451 | Elsaesser | Mar. 20, 1951 |